United States Patent
Doherty et al.

(10) Patent No.: US 8,023,653 B2
(45) Date of Patent: Sep. 20, 2011

(54) MEDIA KEY-TRANSFORMATION OBFUSCATION IN ADVANCED ACCESS CONTENT SYSTEM

(75) Inventors: Richard Doherty, Northridge, CA (US); Robert Hughes, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 944 days.

(21) Appl. No.: 11/973,474

(22) Filed: Oct. 9, 2007

(65) Prior Publication Data

US 2009/0092249 A1  Apr. 9, 2009

(51) Int. Cl.
*H04N 7/167* (2006.01)
*G06F 21/00* (2006.01)

(52) U.S. Cl. .............................. 380/201; 705/57; 726/27

(58) Field of Classification Search .......... 380/200–203; 705/50–63; 726/1–7, 27–33
See application file for complete search history.

(56) References Cited

U.S. PATENT DOCUMENTS

| | | | |
|---|---|---|---|
| 7,017,188 B1 | 3/2006 | Schmeidler et al. | |
| 7,054,443 B1 | 5/2006 | Jakubowski et al. | |
| 7,155,415 B2 | 12/2006 | Russel et al. | |
| 2002/0108061 A1* | 8/2002 | Harrison et al. | 713/201 |
| 2002/0144153 A1 | 10/2002 | LeVine | |
| 2005/0021989 A1 | 1/2005 | Johnson | |
| 2005/0154921 A1 | 7/2005 | Medvinsky | |
| 2005/0216611 A1 | 9/2005 | Martinez | |
| 2006/0090082 A1 | 4/2006 | Apostolopoulos | |
| 2006/0153381 A1* | 7/2006 | Kim et al. | 380/228 |
| 2006/0195909 A1 | 8/2006 | Boswell | |
| 2007/0006238 A1* | 1/2007 | Finger et al. | 719/328 |
| 2007/0014400 A1* | 1/2007 | Wack et al. | 380/44 |

OTHER PUBLICATIONS

Collberg, et al., "Watermarking, Tamper-Proofing, and Obfuscation—Tools for Software Protection", pp. 1-34, Aug. 2002.
Suomalainen, "Content Protection and Authorized Sharing for Mobile Broadcast", pp. 1-16, Sep. 5, 2005.
Monden, et al., "Obfuscated Instructions for Software Protection", pp. 1-15, Nov. 2003.

* cited by examiner

*Primary Examiner* — Gilberto Barron, Jr.
*Assistant Examiner* — Malcolm Cribbs
(74) *Attorney, Agent, or Firm* — Mayer & Williams PC

(57) ABSTRACT

A modified media key used to decrypt protected media content stored on an optical disc, such as an HD-DVD or Blu-ray disc, is created through application of a transformation using a constant value which is programmatically generated by procedural code that runs on a player. The transformation is obfuscated through application of a random value to the constant value through a logical XOR operation. The programmatically-generated constant, called Soft Key Conversion Data ("SKCD") is used by a security layer to derive the modified media key, called a Soft Media Key. At the player, a conventionally calculated media key is used to decrypt the first title, while the Soft Media Key is used to decrypt subsequent titles. Optionally, the SKCD may be updated one or more times so that the Soft Media Key is repeatedly transformed and respectively applied, for example, on a title-by-title basis, or to groups of subsequent titles.

20 Claims, 4 Drawing Sheets

MEDIA KEY-TRANSFORMATION OBFUSCATION IN ADVANCED ACCESS CONTENT SYSTEM

BACKGROUND

The Advanced Access Content System ("AACS") is a specification for protecting prerecorded and recordable media content stored on the next generation of optical media used for DVD (Digital Versatile Disc), including HD DVD™ and Blu-ray™. Such optical media are typically configured for consumer use with PCs (personal computers) and other consumer electronic devices that include high-definition media players. The AACS specification is maintained by AACS Licensing Administrator, LLC ("AACSLA").

AACS provides several mechanisms to manage usage of stored media content which may include movies, games, television programming, and the like. Digital copying is securely prevented by the encoding of the content with a 128 bit AES (Advanced Encryption Standard) key-code. HD DVD and Blu-ray players use their own device key, from which they are able to calculate the correct AES key-code called a Media Key, for each disc through use of a Media Key Block ("MKB"), and typically Key Conversion Data ("KCD"), that are stored on the data-carrier (e.g., an optical disc). Use of the MKB enables AACS to implement a key revocation model by which device keys on specific players that have been compromised, for example through circumvention of the content protection, can be revoked.

In addition, the copy-protection methodology used by AACS supports some Digital Rights Management ("DRM") functionality to provide users with the freedom to consume disc contents legally on other devices such as media-servers or portable equipment. The number and type of devices and the timeframe, in which they can be used, can be defined in the AACS system by the owner of the contents during the media authoring process.

While AACS is performing satisfactorily in many applications, some vulnerability to attack is believed to exist which could compromise the integrity of the protection for the media content. For example, if the base line content protection under AACS is broken, HD DVD and Blu-ray discs can be decrypted without authorization. Once attackers understand the process and secrets behind the AACS content protection methodology, they can write a program that automates the process to allow illegal decryption by users that have minimal technical skill.

As a result of such vulnerability, content providers have expressed interest in a form of content protection that can be applied on a per-title basis, which varies from title-to-title on a DVD disc in order to make it at least somewhat more difficult for an attacker to create an automated program for illegal decryption of the recorded content.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A modified media key -used to decrypt protected media content stored on an optical disc, such as an HD DVD or Blu-ray disc, is created through application of a transformation that uses a constant value which is programmatically generated by procedural code that runs in an application layer that is created during runtime of the optical disc on a player. The transformation is obfuscated through application of a random value to the constant value through a logical XOR operation. The programmatically-generated constant, called Soft Key Conversion Data, or SKCD, is used by a security layer to derive the modified media key, called a Soft Media Key. The first title associated with particular media content on the optical disc is encrypted using the current AACS process. At the player, a conventionally calculated AACS Media Key is used to decrypt the first title, while the modified media key (i.e., the Soft Media Key) is used to decrypt subsequent titles. Optionally, the SKCD may be updated one or more times so that the Soft Media Key is repeatedly transformed and respectively applied, for example, on a title-by-title basis, or to groups of subsequent titles.

In an illustrative example, an API (application programming interface) is utilized to expose methods for setting the constant value and invoking generation of the random value to the code in the application layer. However, to avoid any potential vulnerability to exploitation or attacks mounted through the application layer, neither the Media Key nor Soft Media Key are themselves exposed to the application layer.

The present arrangement for generating the Soft Media Key using key-transform obfuscation advantageously provides a title-specific obstacle in the path of attackers seeking to circumvent content protection by varying the decryption process from title-to-title on disc in an unpredictable way. For example, such obstacle may be used to hinder attackers while the normal AACS key revocation process is underway.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
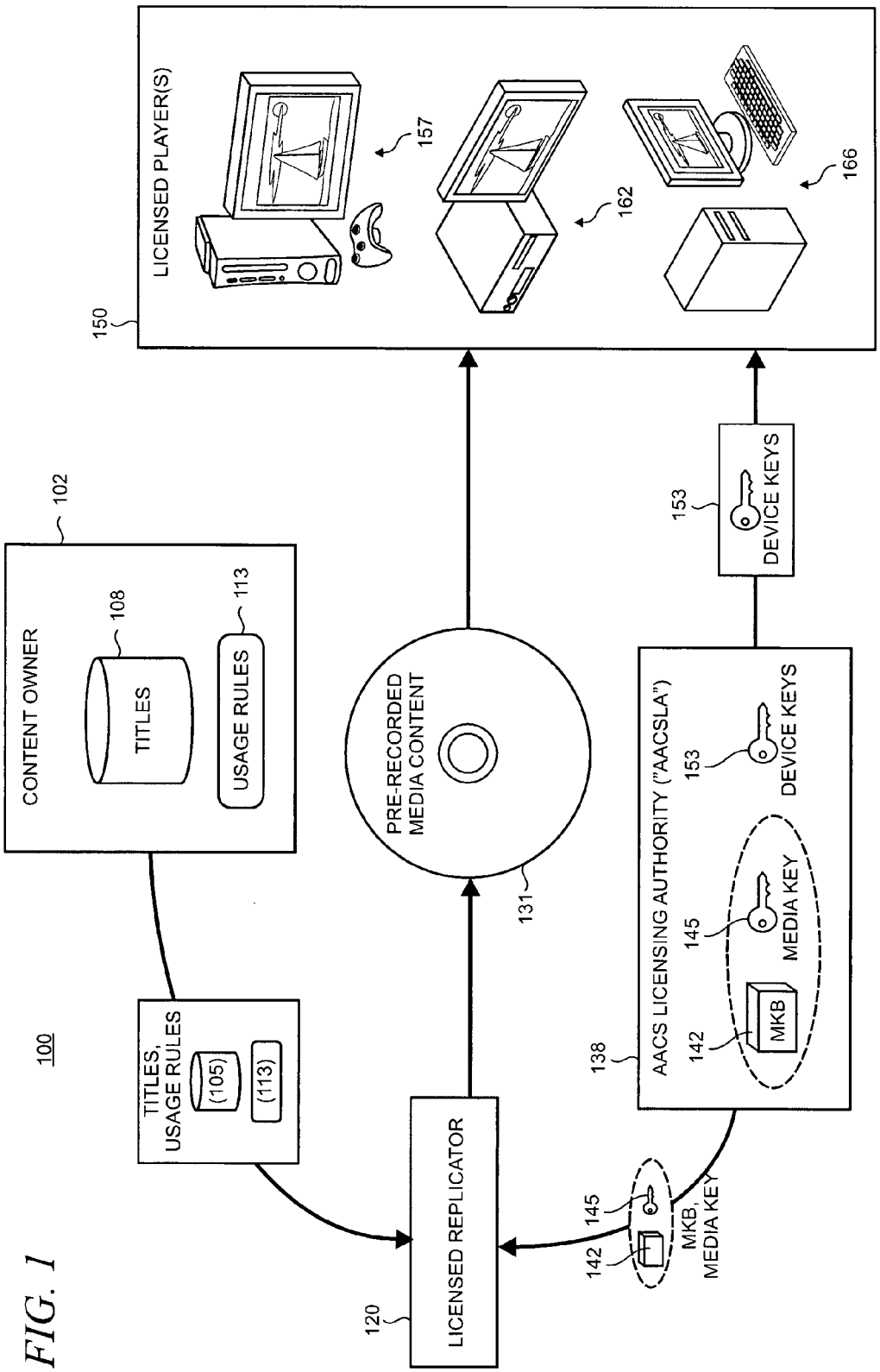
FIG. 1 shows an illustrative next-generation DVD environment in which pre-recorded media content on optical disc in managed.

FIG. 1 shows an illustrative next-generation DVD environment 100 in which pre-recorded media content distributed on an optical disc, such as an HD DVD or Blu-ray disc, is managed in accordance with the existing AACS specification.

It is emphasized that while HD DVD and Blu-ray discs are provided as illustrative examples of the principal commercial next-generation DVD disc formats, the present arrangement for media key-transform obfuscation is not necessarily limited to these formats.

A content owner 102 who requires protection provided by AACS typically provides one or more pieces of media content in the form of titles 108 and associated usage rules 113. "Titles" as used here refers to a group of titles in a title set that typically defines a particular piece of media content, such as movie release, television program, etc. Titles typically include such content as copyright notices, language choices, trailers, as well as the main feature (i.e., the movie or programming itself). Each title may be represented by one or more physical files, referred to as content objects or video objects, on a given DVD. "Titles" here is further used to refer collectively to titles and objects in either HD DVD or Blu-ray formats.

The titles 105 and usage rules 113 are provided to a licensed replicator 120. The licensed replicator 120 is responsible for encrypting prerecorded media content onto an optical disc 131 typically for commercial distribution.

AACSLA 138 provides a Media Key Block 142 ("MKB") and a corresponding secret Media Key 145 to the licensed replicator 120. The MKB 142 enables the licensed players 150 using their own set of secret Device Keys 153 (which are issued by the AACSLA 138) to derive the same Media key which is used unlock the encrypted prerecorded media content on the optical disc 131.

If a set of Device Keys 153 is compromised which could threaten the integrity of the protection under the AACS paradigm, an updated MKB 142 can be released from the licensing authority 138 that will cause the particular licensed player 150 which has the compromised set of Device Keys to calculate a different Media Key 145 from the other licensed players 150. Such updated MKB 142 will thereby cause the compromised Device Keys to be revoked.

As shown in FIG. 1, a variety of different media players are shown as the licensed players 150. These include game console 157, a standalone DVD player 162, and desktop PC 166. Each is configured, in this illustrative example, to render next-generation DVD content (e.g., content formatted on HD DVD and/or Blu-ray) in accordance with AACS. However, these are merely illustrative, as other consumer electronic devices with next-generation DVD/AACS capability may also be utilized in some settings.

Figure 2:
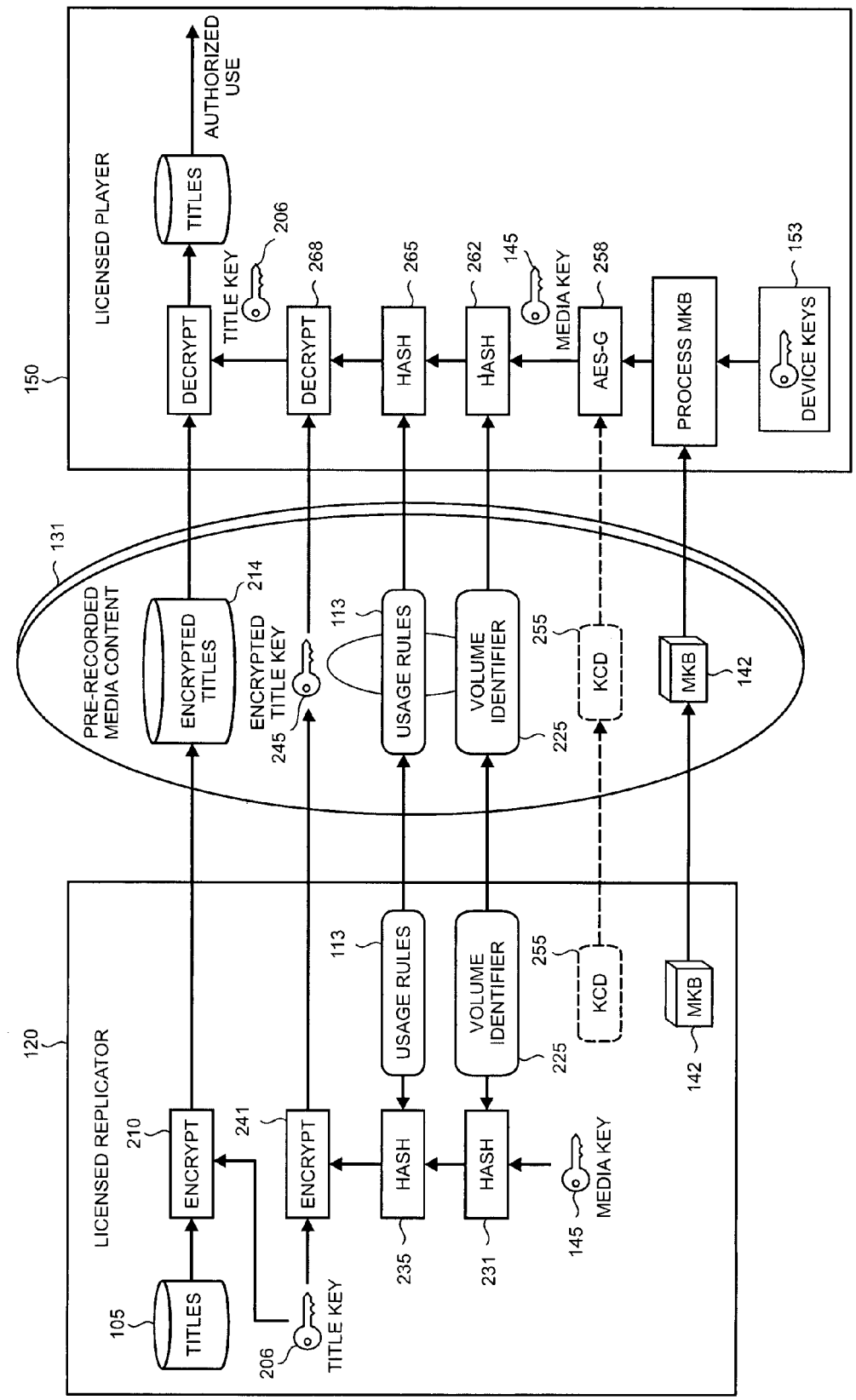
FIG. 2 shows details of the media content encryption and decryption under AACS.

FIG. 2 shows details of the media content encryption and decryption under AACS as performed, respectively by the licensed replicator 120 and a licensed player 150. The licensed replicator 120 selects a secret, random Title Key 206 that is associated with the particular prerecorded media content that will be distributed on optical disc 131. The Title Key 126 is used to encrypt, as shown by block 210, titles 105 into encrypted titles 214. The same Title Key 206 may be used for every instance of optical disc 131, or a different Title Key 206 may be used for different instances.

The licensed replicator 120 also selects a secret unpredictable (i.e., random) identifier to protect the encrypted titles 214. This identifier, known as the Volume Identifier 225, is used to protect against bit-copying of the encrypted titles 214, and is thus stored on the optical disc 131 in a way that cannot be duplicated by consumer optical disc recorders.

For each piece of protected media content on optical disc 131, as indicated by blocks 231 and 235, the licensed replicator 120 calculates a cryptographic hash of the Media Key 145, Volume Identifier 225, and usage rules 113. The licensed replicator 120 uses the resulting hash value to encrypt the Title Key 206, as indicated by block 241. The encrypted Title Key 245, usage rules 113, Volume Identifier 225, and MKB 142 are stored on the optical disc 131 along with the encrypted titles 214.

The Device Keys 153 provided to the licensed player 150 are kept confidential. The Device Keys 153 may be unique per each licensed player 150 or used commonly by multiple licensed players 150. During runtime, a licensed player 150 reads the MKB 142 from the optical disc 131 and uses the Device Keys 153 to process the MKB 142, at block 252, to calculate the Media Key 145. Note that some types of licensed players 150 use Key Conversion Data 255 ("KCD") that is provided by the licensed replicator 120 and stored on the optical disc 131, as shown. In these cases, the result of the MKB processing is a "Media Key Precursor". To obtain the actual Media Key 145, the Media Key Precursor is processed with the KCD 255 using the following:

$$K_m = AES\text{-}G(K_{mp}, KCD) \qquad (1)$$

where $K_m$ is the Media Key, $K_{mp}$ is the Media Key Precursor, and the function AES-G is the well-known AES-based One-Way Function. The Media Key Precursor processing is shown at block 258 in FIG. 2. 10028] If the Device Keys 153 have not been revoked, then the calculated Media Key 145 will be the same as used by the licensed replicator 120. The licensed player 150 then calculates a cryptographic hash of the calculated Media Key 145, Volume Identifier 224, and usage rules 113, as indicated by blocks 262 and 265. The resulting hash value is used to decrypt, as indicated by block 268, the Title Key 206. The resulting Title Key 206 is used to decrypt the encrypted titles 214 so that the titles making up the prerecorded media content may be rendered by the licensed player 150 in an authorized manner under AACS.

The present arrangement for media key-transform obfuscation uses the existing AACS methodology described above to encrypt for the first title (i.e., root title) for a particular piece of media content. At the licensed player, the Media Key 145 is calculated normally and utilized to decrypt the first title. The Media key 145 is then transformed using a programmatically-generated constant called a "Soft Key Conversion Data" or SKCD The programmatically-generated SKCD value is further protected by a random value, or nonce, that is "XORed" (i.e., through application of the logical "exclusive or" function) to the SKCD value. This can provide additional protection, for example, against simple bus sniffing on the licensed player by a hacker seeking to identify the Media Key.

Figure 3:
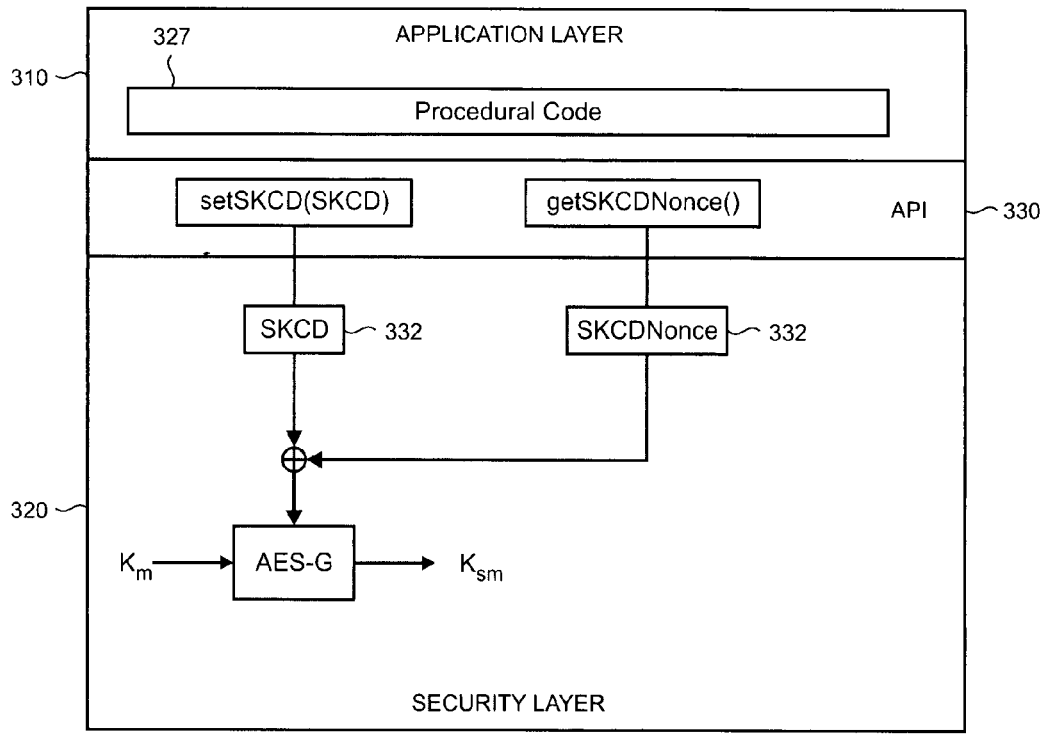
FIG. 3 shows an illustrative layered architecture, having an application layer and a security layer, that is created during DVD runtime on a player.

FIG. 3 shows an illustrative layered architecture 300 that may be used to implement media key-transform obfuscation. Architecture 300 includes an application layer 310 and a security layer 320 which are created during DVD runtime on a licensed player 150 (FIG. 2). The application layer 310 is typically used in both HD DVD and Blu-ray to provide an authoring environment to support interactive features such as menu systems. In HD DVD, the native interactive application layer supports the implementation of interactive Advanced Content as specified by the DVD Forum and is typically compatible with HDi™ players. In Blu-ray, the native interactive application layer is referred to as "BD-Java." These authoring environments generally supports procedural programming through scripting languages such as ECMAScript (standardized by Ecma International as ECMA-262 and often referred to a JavaScript or Jscript), or programming languages such as Java. Declarative programming using, for example XML (extensible Markup Language), is also generally supported by the application layer 310. The security layer 320 is configured to support the AACS implementation on the licensed player 150 in this illustrative example.

As shown in FIG. 3, the application layer 310 supports procedural code 327 that is arranged to invoke several methods that are exposed through an API 330 (application programming interface) that provides the interface to the security layer 320. In this illustrative example, procedural code 327 is associated with the first title in a piece of media content on the optical disc 131 (FIG. 1) so that it loads and runs once a DVD session is underway.

The API methods include setSKCD(SKCD) which enables the programmatically-generated SKCD constant value 332 to be passed to the security layer 320. The SKCD constant value 332 is processed by application of the XOR logical function to a random nonce. The nonce is generated by the security layer 320 through the second method exposed by the API 330—getSKCDNonce( ). While the media keys (both the conventional AACS Media Key, $K_m$, and its present derivation $K_{sm}$) may be manipulated through procedural code 327 code, utilization of the API 330 ensures that neither media key is ever directly exposed to the code or known by the code. This prevents the media keys from being compromised through operation of any kind of malicious code that may be running in the application layer 310.

The security layer 320 applies a transformation to the Media Key, $K_m$, (calculated as described in the text accompanying FIG. 2) by using AES-G One-Way function to thereby derive a modified media key called a Soft Media Key, $K_{sm}$:

$$K_{sm} = AES\text{-}G(K_m, (SKCD \oplus SKCDNonce)) \quad (2)$$

Figure 4:
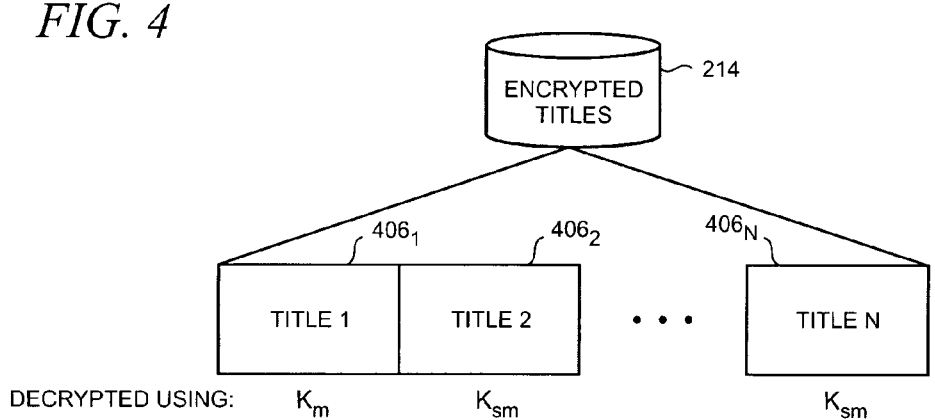
FIG. 4 shows a first illustrative decryption sequence in which a first title on disc is decrypted using an AACS Media Key and subsequent titles are decrypted using a "Soft" Media Key which is derived by the security layer.

FIG. 4 shows a first illustrative decryption sequence. As shown in FIG. 4, the first, or root title $406_1$ associated with the piece of media content is decrypted using the Media Key, $K_m$, that is generated using a conventional AACS process with the KCD value that is generated by the licensed replicator 120 and stored on optical disc 131 (FIG. 1). Subsequent titles, $406_2 \ldots _N$ are decrypted using the Soft Media Key, $K_{sm}$, that is derived by the security layer 320. As noted above in the description accompanying FIG. 3, the Soft Media Key is derived using the constant, SKCD, which is programmatically-generated by procedural code 327 running on the application layer 310 created during DVD runtime on the licensed player 150 (FIG. 1). By varying the decryption process from title-to-title on the optical disc 131 in an unpredictable way, an additional security layer is placed in the path of a would-be hacker seeking to circumvent the AACS protection for the media content on the optical disc 131.

Figure 5:
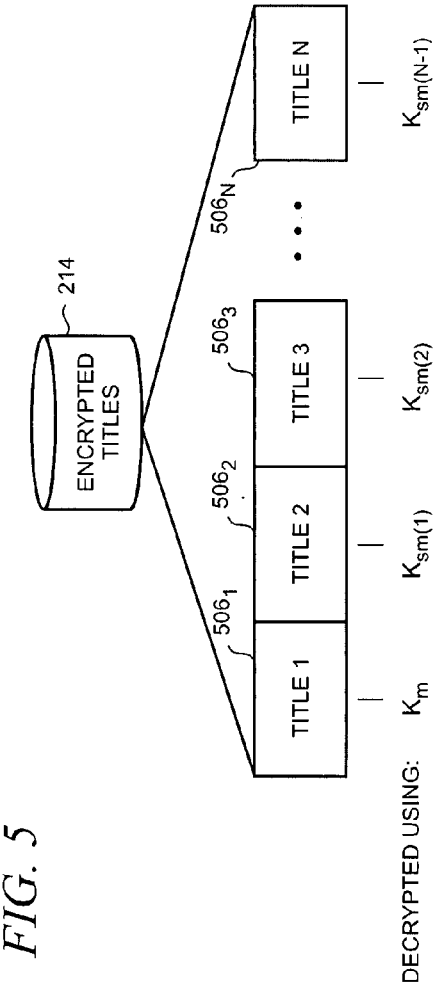
FIG. 5 shows a second illustrative decryption sequence in which a first title on disc is decrypted using an AACS Media Key and subsequent titles are decrypted using different Soft Media Keys on a title-by-title basis.

FIG. 5 shows a second illustrative decryption sequence that a content owner (e.g., content owner 102 in FIG. 1) may wish to optionally utilize in some implementations. The first or root title $506_1$ is decrypted using the conventional AACS process as described above. Subsequent titles, $506_2 \ldots _N$ are respectively decrypted using one of a plurality of different Soft Media Keys $K_{sm(1), (2), \ldots (N-1)}$. These different Soft Media Keys are respectively derived from the SKCD constant which itself is iteratively varied (i.e., updated).

Thus, as illustratively shown in FIG. 5, the first title $506_1$ is protected and decrypted conventionally with the Media Key $K_m$. The Media Key $K_m$ is transformed to $K_{sm(1)}$ and the transformed media key is applied to the subsequent second title $506_2$. It is then transformed again to $K_{sm(2)}$ and applied to the subsequent third title $506_3$. However, it is emphasized that the particular number of transformations utilized can vary. For example as shown in FIG. 5, the SKCD constant may be updated so that the media key is transformed and applied to each subsequent title, on a title-by-title basis up to the total number of titles, N, on the optical disc 131.

Figure 6:
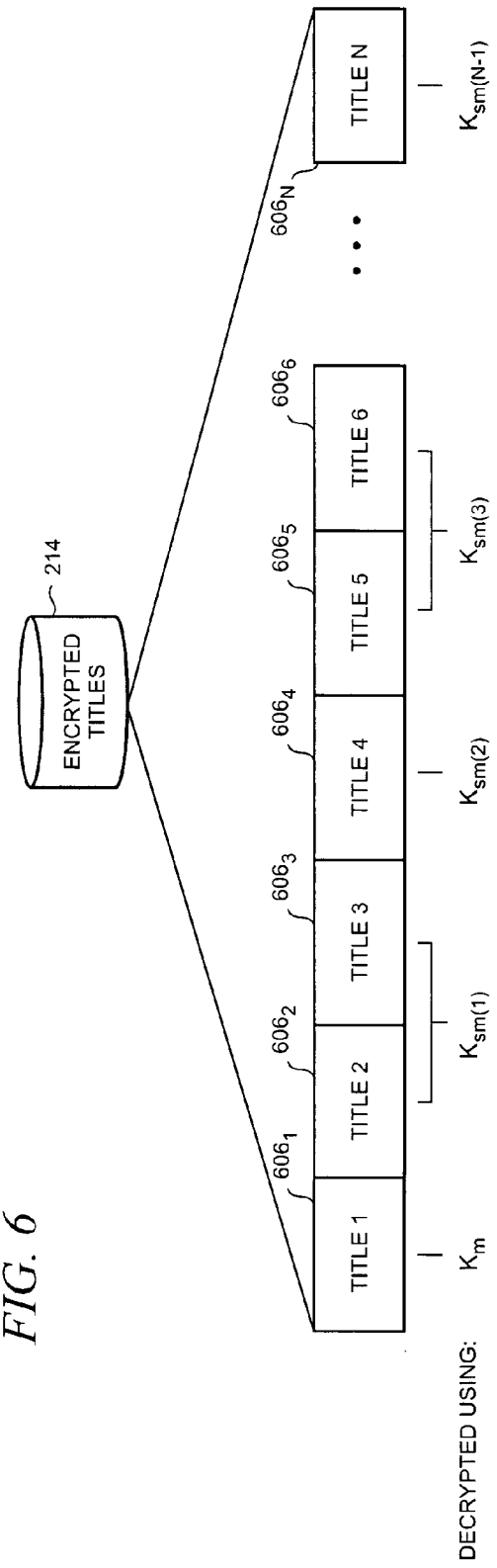
FIG. 6 shows a third illustrative decryption sequence in which a first title on disc is decrypted using an AACS Media Key and subsequent titles are decrypted using different Soft Media Keys Like reference numerals indicate like elements in the drawings.

Alternatively, instead of transforming and applying the media key on a title-by-title basis, the key may be applied to more than one subsequent title (i.e., to a group of titles) at a time before being transformed again and applied to the next subsequent title or group of titles. FIG. 6 shows, for example, a third illustrative decryption sequence that a content owner (e.g., content owner 102 in FIG. 1) may optionally utilize in alternative implementations. In this example, the first title $606_1$ is protected and decrypted conventionally with the Media Key $K_m$. The Media Key $K_m$ is transformed to a Soft Media Key, $K_{sm(1)}$ and the transformed key is applied to each of the titles in a group comprising the subsequent second and third titles, $606_2$ and the $606_3$. The media key is transformed to $K_{sm(2)}$ and the transformed media key is applied singly to the next subsequent title $606_4$. The next transformed media key $K_{sm(3)}$ is applied to each of the titles in a group of titles comprising the subsequent fifth and sixth titles $606_5$ and $606_6$, respectively. Then, $K_{sm(N-1)}$ is applied singly to $N^{th}$ title $606_N$. It is noted that the sequence shown in FIG. 6 is merely illustrative, and the particular size of the title groups and pattern by which the different transformed media keys are applied can vary to meet the requirements of specific scenarios.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for decrypting protected media content stored on a carrier, the method comprising the steps of:
    decrypting a first portion of the media content using an AACS media key;
    using a programmatically-generated constant value as a first input into a transformation function; and
    decrypting a second portion of the media content using a soft media key, the soft media key being derived using the transformation function to which the AACS media key is a second input.

2. The method of claim 1 in which the programmatically-generated constant value is generated by code running in an application layer, the application layer being created during runtime of the media content on a rendering device.

3. The method of claim 1 including a further step of iteratively applying a transformation function to generate a plurality of different soft media keys, each of the different soft media keys being applied to decrypt respective portions of the media content.

4. The method of claim 3 in which the each of the plurality of different soft media keys are applied to groups of titles in the media content, or are applied on a title-by-title basis.

5. The method of claim 2 in which the code comprises one of ECMAScript or Java.

6. The method of claim 2 including a further step of applying a logical XOR function to the constant value and a random value.

7. The method of claim 6 in which the random value is generated by a method that is invoked by the code.

8. The method of claim 1 in which the transformation function is an AES based One Way function.

9. A method for protecting media content stored on an optical disc, the method comprising the steps of:
    executing code in an application layer that is created during runtime of the media content from the optical disc;
    exposing to the application layer a method for setting a constant value for soft key conversion data that is used as an input to a transformation of a media key, the media key being arranged for decrypting protected media content; and exposing to the application layer a method for invoking generation of a random value for obfuscating the transformation by applying a logical XOR function to the random value and the constant value for the soft key conversion data.

10. The method of claim 9 in which the applying is performed by a security layer that is created during runtime of the media content from the optical disc.

11. The method of claim 9 in which the optical disc is one of HD DVD disc, or Blu-ray disc.

12. The method of claim 9 in which the method for setting and the method for invoking are exposed to the application layer using an API.

13. The method of claim 9 in which the application layer is an HDi layer, or a BD Java layer.

14. A non-transitory computer-readable storage medium containing instructions which, when executed by one or more processors disposed on an electronic device, performs a method for rendering a piece of protected media content by the electronic device, the method comprising the steps of:

creating a layered environment including an application layer and a security layer, the application layer and security layer being arranged to interface through an API;

generating an AACS media key for decrypting a first title of the media content;

generating a transformation of the AACS media key using a constant value that is created by code executing in the application layer; and obfuscating the transformation using a random value that is generated by the security layer.

15. The non-transitory computer-readable storage medium of claim 14 in which the electronic device is selected from one of PC, game console, DVD player, or consumer electronic device that supports AACS.

16. The non-transitory computer-readable storage medium of claim 14 in which the security layer implements methods that conform to AACS.

17. The non-transitory computer-readable storage medium of claim 14 in which the obfuscating comprises applying an XOR logical function to the constant value and the random value.

18. The non-transitory computer-readable storage medium of claim 14 in which the API exposes a method to the application layer, the method being arranged for generating the random value.

19. The non-transitory computer-readable storage medium of claim 14 in which the transformation generating comprises calculating a modified media key for decrypting titles of the media content that are subsequent to the first title.

20. The non-transitory computer-readable storage medium of claim 19 in which the API is configured to preclude i) exposing the AACS media key to the application layer, or ii) exposing the modified media key to the application layer.

* * * * *